Jan. 4, 1955

H. C. MILNER ET AL 2,698,608

WINDSHIELD WIPER MOTOR

Filed Nov. 4, 1952

INVENTORS
Harry C. Milner and
Stanley W. Newman

BY Mason, Fenwick & Lawrence
ATTORNEYS

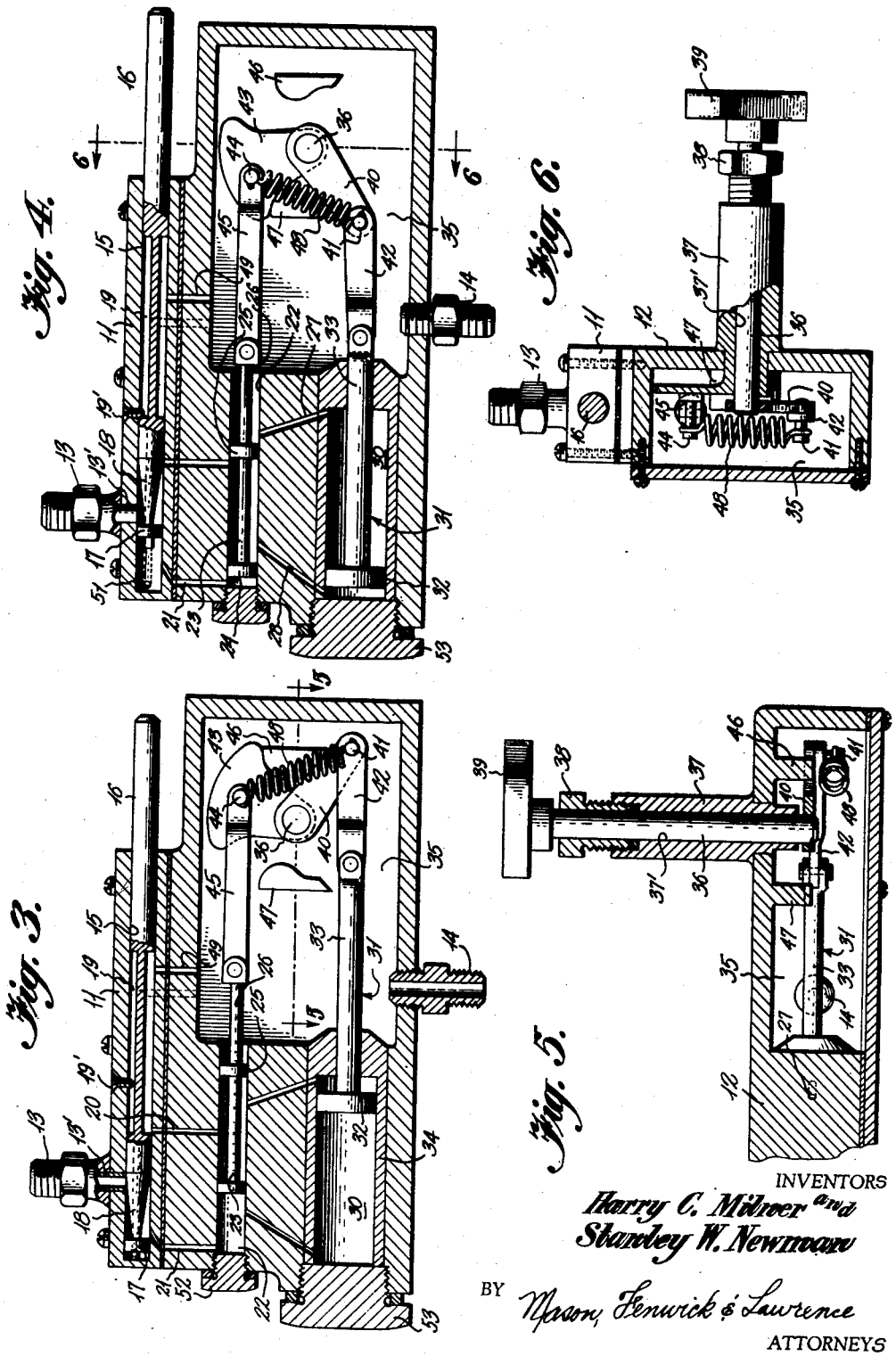

United States Patent Office 2,698,608
Patented Jan. 4, 1955

2,698,608

WINDSHIELD WIPER MOTOR

Harry C. Milner, Fort Worth, Tex., and Stanley W. Newman, Tampa, Fla.

Application November 4, 1952, Serial No. 318,567

5 Claims. (Cl. 121—164)

The present invention relates in general to fluid pressure actuated motors, and more particularly to hydraulic motors for driving windshield wipers and the like.

The majority of automobile windshield wipers used today are operated by vacuum actuated motors which effect oscillation of a shaft to which an arm and cleaner blade are attached, the vacuum being usually derived from the intake manifold of the internal combustion engine. The principal objection to such vacuum operated windshield wiper motors is that the vacuum used for driving the motor varies widely as a function of the load and throttle opening of the internal combustion engine for the vehicle. For example, when the engine throttle is open, the intake manifold vacuum is severely reduced, resulting in the windshield wiper motor either slowing down or stopping completely until normal vacuum conditions are restored in the intake manifold. The small power output of such vacuum motors is also a hindrance to efficient operation of the windhield wiper.

An object of the present invention is the provision of a novel windshield wiper motor for automobiles and the like, which is hydraulically operated by the automobile oil pressure, thereby eliminating the above described disadvantages incident to vacuum windshield wiper motors.

Another object of the present invention is the provision of a windshield wiper motor operated by hydraulic pressure, which is simple in construction and is provided with a minimum of moving parts, resulting in a reduction in manufacturing and maintenance cost.

Another object of the present invention is the provision of a novel windshield wiper motor operated by hydraulic pressure, in which all the moving parts are disposed in the hydraulic flow path to effect automatic lubrication of all moving parts.

Other objects, advantages and capabilities of the present invention will become apparent from the following detail description, taken in conjunction with the accompanying drawings, wherein only a preferred embodiment of the invention is illustrated.

In the drawings:

Figure 3 is a vertical longitudinal section of the hydraulic windshield wiper motor embodying the present invention, illustrating the valves and moving parts thereof in the positions assumed when the control valve is closed and the motor is at rest, taken along the lines 3—3 of Figure 1;

Figure 4 is a vertical longitudinal section of the hydraulic windshield wiper motor embodying the present invention, taken from the same position as Figure 3, but illustrating the parts in one position assumed during operation thereof;

Figure 5 is a horizontal longitudinal section of a part of the hydraulic windshield wiper motor, taken along the lines 5—5 of Figure 3; and Figure 6 is a vertical transverse section taken through the windshield wiper motor housing along the lines 6—6 of Figure 4.

Figure 1:
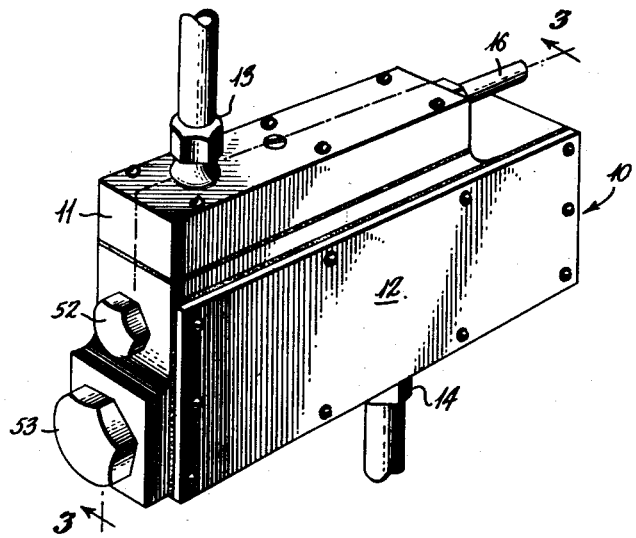
Figure 1 is a perspective view of a hydraulic windshield wiper motor embodying the present invention, viewed from one side thereof.
Figure 2:
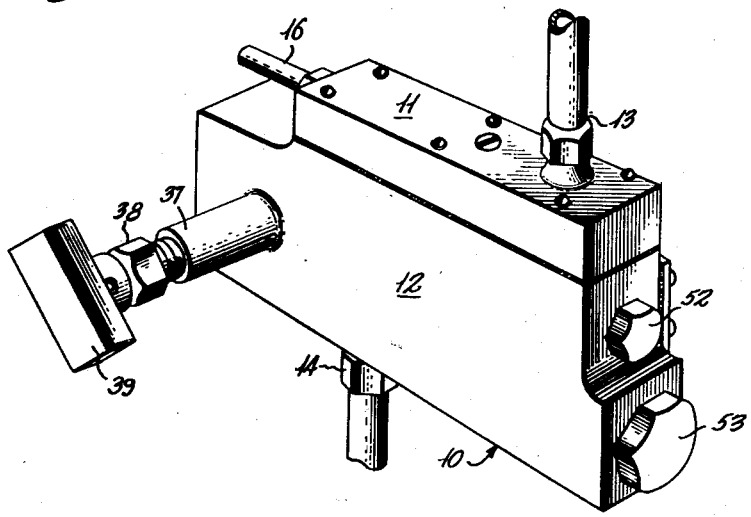
Figure 2 is a perspective view of the hydraulic windshield wiper motor embodying the present invention viewed from the opposite side thereof.

Referring to the drawings, wherein like reference characters designate corresponding parts throughout the several figures, the housing for the hydraulic windshield wiper motor, which is generally indicated by the reference character 10, is a completely enclosed unit, with the plates forming the walls and head thereof packed with gaskets or the like and bolted to the main body portion in accordance with well known conventional practice to prevent seepage of the hydraulic fluid therefrom.

The housing 10 is provided with inlet and outlet threaded coupling elements 13 and 14, respectively, having conduits 13' and 14' therein, located in the head 11 and bottom 12 of the housing 10, for the admission and return of hydraulic fluid to the motor housing 10. As illustrated in the section drawings of Figures 3 and 4, the head 11 or upper portion of the motor housing 10 is provided with a longitudinal bore 15 extending substantially the length of the head 11 and opening through one end thereof. The bore 15 slidably receives a manual control valve 16 in the form of an elongated rod having a disk 17 at the inner end thereof snugly fitting the bore 16 and a portion along the valve stem adjacent the disk 17 tapering as indicated at 18 from a small diameter at the disk 17 to a larger diameter at a point removed therefrom. A slot 19 is formed in the stem of the manual control valve 16 adapted to accommodate a set screw 19' in the head 11 limiting the extent of outward sliding movement of the manual control valve 16.

A pair of fluid supply conduits 20 and 21 spaced longitudinally from each other a selected distance extend vertically downward from the manual control valve bore 15 to an intermediate horizontal bore 22 housing a reciprocating slide valve piston 23 having disks 24 and 25 spaced apart a distance equal to the spacing between the conduits 20 and 21 and snugly fitting the bore 22, the valve piston 23 having an integral arm 26 projecting through the open inner end of the bore 22. The intermediate bore 22 is in turn connected through conduits 27 and 28 which extend along generally divergent axes to a master cylinder 30 which is disposed on an axis parallel to that of the intermediate bore 22 and manual valve bore 15. The master cylinder 30 houses a master drive piston 31 having a disk 32 snugly fitting the master cylinder 30 and a piston rod 33 projecting through an aperture in a suitable cylinder liner 34 into a hollow chamber 35 disposed within the housing body 12 and accommodating the intercoupling means between the drive piston and the element to be driven.

Disposed on an axis transverse to the longitudinal axis of the housing 10 is a shaft 36 journaled in a laterally projecting boss 37 formed on the housing body 12, the bore 37' of the boss 37 being closed at its outer end by the conventional packing gland nut 38 and an end drive connector 39 being fixed to the outer end of the shaft 36 to receive the end of the windshield wiper arm or like device to be oscillated.

The inner end of the shaft 36 projects within the chamber 35 in the housing body 12 and has welded to the inner end thereof a crank arm 40 pivotally coupled by the stud 41 to one end of a link 42, the other end of which is suitably coupled to the end of the master piston rod 33. A sector member 43, in the form of an arcuate segment, is freely journaled at one end about the shaft 36, and is provided at a point substantially along the bisector thereof with a stud 44 to which one end of a linkage member 45 is pivotally coupled, the other end of the link 45 being pivotally coupled to the arm 26 of the slide valve piston 23. A pair of sector stops 46 and 47 are fixed onto the walls of the housing body 12 and disposed within the chamber 35 to engage the sides of the sector member 43 and limit the oscillation of the same about the shaft 36. A coil spring 48 extends between the stud 41 on the crank arm 40 and the stud 44 on the sector member 43, which serves to rapidly reciprocate the sector member 43 between the stops 46 and 47 as the coil spring 48 is shifted by the crank arm 40 through the medial axis of the shaft 36.

A conduit 49 extends from the chamber 35 upwardly through the housing body and head into the manual valve bore 15 and is coupled through a slot 50 extending longitudinally in the lower portion of the manual valve stem 16 to the fluid conduit 20 to admit hydraulic fluid from the master cylinder 30 to the chamber 35 in a manner to be hereafter described.

Additionally a relief duct 51 extends from a point adjacent the inner end of the manual control valve bore 15 through the head 11 and into the chamber 35 to by-pass hydraulic fluid into the chamber 35 for certain settings of the manual valve 16. The outlet coupling 14 extends through the bottom of the housing-body 12 and into the chamber 35 to permit the return of hydraulic fluid to the source of supply.

Suitable threaded plugs and gaskets 52 and 53 are mounted in one end of the housing 10 forming the closures for the intermediate bore 22 and master cylinder 30 and permitting inspection of these two bores to facilitate servicing of the device.

Operation of the device is as follows:

Hydraulic fluid under pressure, which may be conventional lubricating oil coupled from the internal combustion engine, is conducted through suitable conduit to the inlet coupling 13 on the housing head 11, and thence through the inlet conduit 13' into the manual control valve bore 15. With the manual control valve in "Off" position as indicated in Figure 3, and the slide valve piston 23 and master drive piston 31 in the positions of rest illustrated in Figure 3, the hydraulic fluid will be coupled through the portions of the bore 15 surrounding the tapered portion 18 of the valve 16 and thence through the conduit 21, intermediate bore 22, and conduit 28 into the master piston 30. No further movement of the fluid is possible with the parts in this condition, so that no movement is imparted to the motor.

When the manual control valve 16 is moved outwardly of the housing 10 until the set screw 19' abuts the end of the limit slot 19, the disk 17 on the valve 16 is disposed just to the left of the inlet conduit 13', as illustrated in Figure 4, and the tapered portion 18 of the valve 16 extends beyond the conduit 20, so that the hydraulic fluid is coupled from the inlet conduit 13' through the bore 15 and conduit 20 into the intermediate bore 22. The slide valve piston 23 being in the position illustrated in Figure 3 at this point, the hydraulic fluid will flow through the bore 22 between the slide valve disks 24 and 25 into the conduit 27, and thence into the master cylinder 30 in the portion to the right of the drive piston disk 32, as viewed in Figure 3. This will force the master drive piston 31 toward the position assumed by the piston 31 in Figure 4, the fluid to the left of the disk 32 being forced through the conduit 28, intermediate bore 22, conduit 21 and the manual control valve bore 15 into the by-pass relief duct 51, causing the chamber 35 to be filled and thereby completely immersing the crank arm 40, sector member 43, and related parts in the hydraulic fluid.

As the master drive piston 31 is forced from the position illustrated in Figure 3 to the position shown in Figure 4, the crank arm 40 welded to the shaft 37 and coupled by linkage 42 to the piston rod 33 is rotated in a clockwise direction as viewed in Figure 3, from the position shown in Figure 3 to the position shown in Figure 4, the lower end of the coil spring 48 coupled to the stud 41 being carried thereby. It will be apparent that as the axis of the coil spring 48 passes through the medial axis of the shaft 36, the direction of the resilient bias on the sector 43 caused by the coil spring 48 swings through the bisecting axis of the sector 43, so that as soon as the coil spring 48 passes through the center of the shaft 36, the sector 43 is immediately shifted from its position shown in Figure 3 in contact with the stop 46 into position illustrated in Figure 4 resting against the stop 47. The intermediate slide valve 23 is thereby shifted from the position of Figure 3 to that of Figure 4 through the linkage 45 pivoted to the sector 43, the disk 45 of the intermediate valve 23 being then disposed to interrupt flow between the conduits 20 and 27, and the other disk 24 of the valve 23 being shifted beyond the conduit 28, thereby coupling the conduit 28 with the conduit 20 for the flow of oil into the portion of the master cylinder 30 to the left of the master piston disk 32.

The hydraulic pressure then forces the master piston 31 to the right toward the position illustrated in Figure 3, resulting in the rotation of the crank arm 40 in a counterclockwise direction to shift the coil spring 48 back through the medial axis of the shaft 36 and rapidly rotate the sector 43 back to the position illustrated in Figure 3 as the coil spring 48 passesover center, thus shifting the slide valve piston 23 back to the position illustrated in Figure 3. As the drive piston 31 moves to the right, hydraulic fluid is coupled from the portion of the master cylinder 30 extending to the right of the disk 32 through the conduit 27 and the intermediate bore 22 into the chamber 35 through the end of the bore 22 opening into the chamber 35.

By the specific intercoupling employed between the main drive piston 31 and intermediate piston 23, the piston 23 is shifted through its full range of travel sustantially immediately upon the coil spring 48 passing through the medial axis of the shaft 36, causing full pressure flow on the main drive piston disk 32 immediately after the coil spring passes over the center of the shaft 36. This oscillatory rotation of the shaft 36 is imparted to the windshield wiper arm or other desired device by mounting the arm on the end coupling connector 39.

To shut off the unit, the manual control valve 16 is forced inwardly until the end thereof contacts the end of the bore 15, interrupting the flow path between the inlet conduit 13' and the conduit 20 and coupling the fluid from the inlet 13' through the conduit 21, the bore 22 and conduit 28 into the master cylinder 30, to force the slide valve piston 23 and master piston 32 to the right-hand positions illustrated in Figure 3.

It will be apparent from the above description that a hydraulic fluid driven motor for windshield wipers and the like has been provided, which has a minimum number of moving parts simplifying construction and maintenance of the unit, which provides for positive oscillation under hydraulic power of an output shaft through a preselected arm, and in which all the moving parts are disposed in the flow path of the hydraulic fluid and immersed therein to maintain continuous automatic lubrication of parts.

While but one patricular embodiment of the invention has been particularly shown and described, it is distinctly understood that the invention is not limited thereto but that various modifications may be made in the invention without departing from the spirit and scope thereof, and it is desired, therefore, that only such limitations shall be placed thereon as are imposed by the prior art and are set forth in the appended claims.

What is claimed is:

1. A fluid pressure motor for windshield wipers and the like comprising a main cylinder, a drive piston therein, an intermediate cylinder, a piston valve reciprocally movable in said intermediate chamber, a fluid inletport, a fluid control cylinder, means coupling said inlet port to said intermediate cylinder through said fluid control cylinder, a pair of fluid conducting conduits extending from said intermediate cylinder to opposite ends of said main cylinder, said piston valve coupling fluid pressure from said inlet port alternately to the conduits at opposite ends of said main cylinder when said piston valve is disposed at opposite ends of its stroke to impart reciprocal movement to said main piston, a shaft journaled in a bearing, first eccentric means fixed to said shaft and pivoted to said main piston, second eccentric means freely journaled on said shaft and linked to said piston valve means limiting movement of said second eccentric means, connecting means intercouple between said first and second eccentric means to shift said second eccentric means through its limited movement upon passage of said connecting means through the medial axis of said shaft to shift said piston valve in delayed relation to movement of said main piston and selectively reverse fluid pressure flow into said main cylinder, and a control rod axially movable in said fluid control cylinder and having a tapered valve portion terminating in a disk of the diameter of said control cylinder to be manually adjusted upon movement of said rod to vary the position of said tapered portion between said inlet port and said means coupling the inlet port to said intermediate cylinder for controlling the fluid pressure coupled to said intermediate cylinder and the speed of said piston valve.

2. A fluid pressure motor for windshield wipers and the like comprising a closed motor housing, a main cylinder in said housing, a drive piston reciprocally movable in said main cylinder, an intermediate cylinder in said housing, a piston valve reciprocally movable in said intermediate chamber, a fluid inlet port in said housing, a control cylinder in said housing disposed between said inlet port and said intermediate cylinder in parallel relation to said intermediate cylinder, a pair of longitudinally spaced fluid conduits, coupling said control cylinder to said intermediate cylinder, a pair of fluid conducting conduits extending from said intermediate cylinder to opposite ends of said main cylinder, said piston valve coupling fluid pressure from said inlet port alternately to the conduits at opposite ends of said main cylinder when said piston valve is disposed at opposite ends of its stroke to impart reciprocal movement to said main piston, a shaft journaled in said housing having a crank arm rigidly formed thereon and pivotally coupled to said main piston, a member pivoted for rotation about said shaft and linked to said piston valve, means limiting the pivotal movement of said pivoted member, resilient means intercoupled between an end of said crank arm and said pivoted member to shift said pivoted member through its limited movement upon passage of said resilient means through the medial axis of said shaft to shift said piston valve in delayed relation to movement of said main piston and selectively reverse fluid pressure flow into said main cylinder, and a control rod axially movable in said fluid control cylinder and having a shaft portion of the diameter of said control cylinder terminating in a valve portion comprising a tapered conical formation and a terminal disk of the diameter of said control cylinder, said valve portion of said control rod controlling the fluid pressure coupled to said intermediate cylinder and the speed of said piston valve in accordance with the portion of said tapered formation positioned in juxtaposition with one of said first mentioned fluid conduits, and said control rod terminating fluid pressure supply to said intermediate cylinder when said shaft portion of said control rod is juxtapositioned with said one of said first mentioned fluid conduits.

3. A hydraulic fluid pressure motor for windshield wipers and the like comprising a housing, a main cylinder in said housing, a drive piston therein, an intermediate cylinder in said housing, a piston valve reciprocally movable in said intermediate chamber, a fluid inlet port, means coupling said inlet port to said intermediate cylinder, a pair of fluid conducting conduits extending from said intermediate cylinder to opposite ends of said main cylinder, said piston valve coupling hydraulic fluid pressure from said inlet port alternately to the conduits at opposite ends of said main cylinder when said piston valve is disposed at opposite ends of its stroke to impart reciprocal movement to said main piston, a shaft journaled in said housing, first eccentric means fixed to said shaft and pivoted to said main piston to effect oscillatory rotation of said shaft in reciprocation of said main piston, second eccentric means freely journaled on said shaft and linked to said piston valve, means limiting movement of said second eccentric means, and connecting means intercoupled between said first and second eccentric means to shift said second eccentric means through its limited movement upon passage of said connecting means through the medial axis of said shaft to shift said piston valve in delayed relation to movement of said main piston and selectively reverse hydraulic fluid pressure flow into said main cylinder, a closed chamber within said housing, said first and second eccentric means being disposed in said chamber, an outlet port in said chamber, and fluid return means from said intermediate cylinder to said chamber, said piston valve directing the hydraulic fluid returning from said main cylinder through said return means to said chamber whereby said first and second eccentric means disposed in said chamber are immersed in the hydraulic fluid returning from said intermediate cylinder for continuously lubricating said eccentric means.

4. A hydraulic fluid pressure motor for windshield wipers and the like comprising a closed motor housing, a main cylinder in said housing, a drive piston therein, an intermediate cylinder in said housing, a piston valve reciprocally movable in said intermediate chamber, a fluid inlet port in said housing, means coupling said inlet port to said intermediate cylinder, a pair of fluid conducting conduits extending from said intermediate cylinder to opposite ends of said main cylinder, said piston valve coupling hydraulic fluid pressure from said inlet port alternately to the conduits at opposite ends of said main cylinder when said piston valve is disposed at opposite ends of its stroke to impart reciprocal movement to said main piston, a shaft journaled in said housing having a crank arm rigidly formed thereon and pivotally coupled to said main piston, a sector plate pivoted for rotation about said shaft and linked to said piston valve, means limiting movement of said sector plate, and a coil spring intercoupled between an end of said crank arm and a point on the bisecting axis of said sector plate to shift said sector plate through its limited movement upon passage of said coil spring through the medial axis of said shaft to shift said piston valve in delayed relation to movement of said main piston and selectively reverse hydraulic fluid pressure flow into said main cylinder, a closed chamber within said housing, said crank arm and pivoted member being disposed in said chamber, an outlet port at one end of said chamber, and one end of said intermediate cylinder opening into said chamber, said piston valve at one end of its stroke directing the hydraulic fluid returning from said main cylinder through said open end of said intermediate cylinder into said chamber on movement of said main piston whereby said first and second eccentric means disposed in said chamber are immersed in the hydraulic fluid returning from said intermediate cylinder for continuously lubricating said eccentric means.

5. A hydraulic fluid pressure motor for windshield wipers and the like comprising a main cylinder, a drive piston therein, an intermediate cylinder, a piston valve reciprocally movable in said intermediate chamber, a hydraulic fluid inlet port, means coupling said inlet port to said intermediate cylinder, a pair of fluid conducting conduits extending from said intermediate cylinder to opposite ends of said main cylinder, said piston valve controlling the flow of hydraulic fluid pressure to said conduits to admit hydraulic fluid pressure from said inlet port to one end of said main cylinder when said piston valve is disposed at one end of its stroke to drive said main piston in one direction and to admit hydraulic fluid pressure to the opposite end of said main cylinder from said inlet port when said piston valve is at the opposite end of its stroke to reverse the movement of said main piston, a shaft journaled in said housing, first eccentric means fixed to said shaft and pivoted to said main piston, second eccentric means freely journaled on said shaft and pivoted for rotation about said shaft and linked to said piston valve, means limiting movement of said second eccentric means, and connecting means intercoupled between said first and second eccentric means to shift said second eccentric means through its limited movement upon passage of said connecting means through the medial axis of said shaft to shift said piston valve in delayed relation to movement of said main piston and selectively reverse hydraulic fluid pressure flow into said main cylinder, a closed chamber with said housing, said crank arm and pivoted member being disposed in said chamber, an outlet port at one end of said chamber, and one end of said intermediate cylinder opening into said chamber, said piston valve at one end of its stroke directing the hydraulic fluid returning from said main cylinder through said open end of said intermediate cylinder into said chamber on movement of said main piston whereby said first and second eccentric means disposed in said chamber are immersed in the hydraulic fluid returning from said intermediate cylinder for continuously lubricating said eccentric means.

References Cited in the file of this patent

UNITED STATES PATENTS

| 1,953,262 | Police | Apr. 3, 1934 |
| 2,057,317 | Ruud | Oct. 13, 1936 |
| 2,487,113 | Doyle | Nov. 8, 1949 |

FOREIGN PATENTS

| 587,610 | France | Jan. 20, 1925 |